June 23, 1931.　　　　B. T. SPRY　　　　1,811,033
SMUDGE POT LIFTER
Filed Aug. 27, 1930
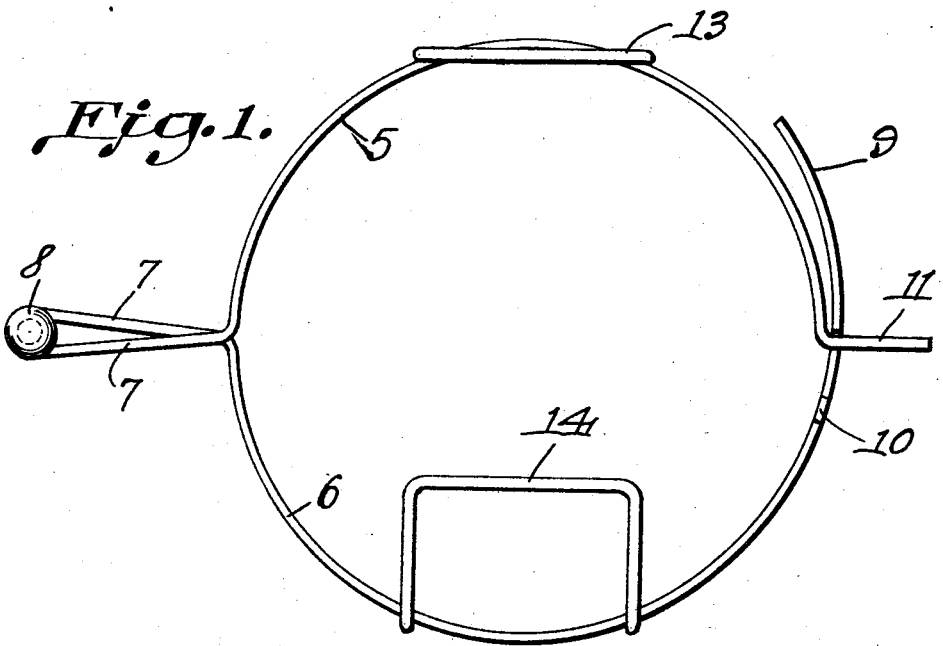
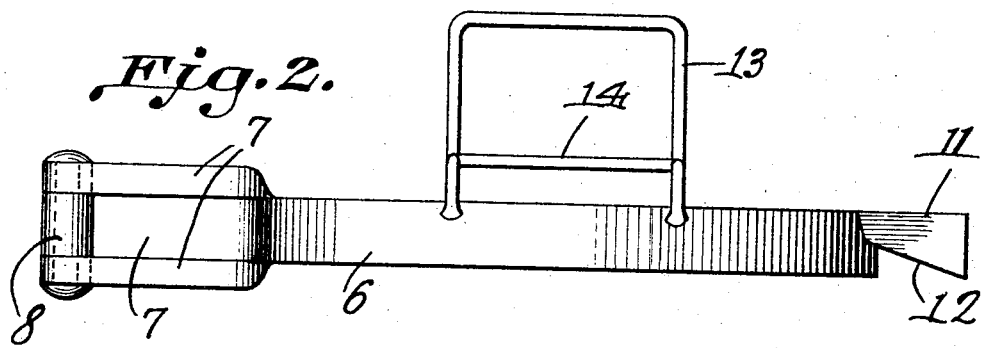
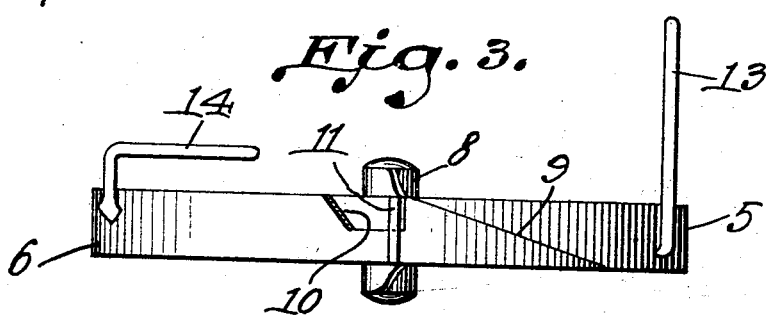
B. T. Spry Inventor
By C. A. Snow & Co.
Attorneys.

Patented June 23, 1931

1,811,033

UNITED STATES PATENT OFFICE

BURGESS TOLLSPRY, OF SAN DIMAS, CALIFORNIA

SMUDGE POT LIFTER

Application filed August 27, 1930. Serial No. 478,220.

This invention relates to lifters designed for use in lifting smudge pots or orchard heaters, the primary object of the invention being to provide means to facilitate the handling of smudge pots or orchard heaters.

An important object of the invention is to provide a device of this character including a body portion comprising hingedly connected sections, the hinge being so constructed that pressure will be directed to the meeting ends of the sectional body portion, to cause them to securely engage the smudge pot or orchard heater with which the lifter is used.

A further object of the invention is to provide means on the body portion to prevent the lifter from being forced downwardly over the smudge pot or orchard heater, too far, to permit the device to be lifted by the handle.

With the foregoing and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings:

Figure 1 is a plan view of a device constructed in accordance with the invention.

Figure 2 is a side elevational view thereof.

Figure 3 is a front elevational view of the heater.

Referring to the drawings in detail, the lifter comprises a body portion embodying curved sections 5 and 6 respectively, the sections 5 and 6 having extensions 7, the ends of the extensions being formed into a hinge 8, whereby the sections are pivotally connected.

The extension 7 of the section 5 is cut away throughout its length, to receive the extension 7 of the section 6, so that the sections 5 and 6 will be held in alignment at all times to provide a rigid structure to firmly grip or embrace the smudge pot or orchard heater with which the device is used.

The upper edge of the section 6, adjacent to the free end thereof, is beveled as at 9, and is provided with a notch 10 forming a continuation of the beveled edge. The free end of the section 5 extends at right angles as at 11 and has its lower edge inclined upwardly as at 12 to fit within the notch 10 to hold the free ends of the sections together.

The lifter is provided with a handle 13 that extends upwardly from the section 5, while at the opposite side of the device, is a stop indicated by the reference character 14 which extends inwardly from the section 6, to overlie the upper edge of the smudge pot or orchard heater on which the device is positioned. Thus it will be seen that due to this construction, the member 14 will act as a support for the device while the sections 5 and 6 are being moved into locking engagement with each other.

In the use of the device the sections 5 and 6 are moved to their open positions, whereupon the device is positioned over a smudge pot or orchard heater. The ends of the sections 5 and 6 are now moved towards each other until the member 11 moves into the notch 10, locking the free ends of the sections together. The device is now securely held in position on the smudge pot or orchard heater, and may be lifted to move the smudge pot or orchard heater, by the person gripping the handle 13.

While I have shown and described the device as curved to fit a curved smudge pot or orchard heater, it is to be understood that the shape of the device may be square or any desired configuration to fit around a smudge pot or orchard heater of any particular shape.

I claim:

1. A lifter of the class described, comprising pivotally connected sections, means for securing the free ends of the sections together, means on the device for engaging the upper edge of the article to be lifted by the device to support the lifter while the free ends of the sections are brought together, and a handle on the lifter.

2. A lifter of the class described comprising sections shaped to fit over an article to be lifted, each of said sections having an extension at one end thereof extended at right angles, the free ends of the extensions being formed into a hinge, one of the extensions being cut away throughout its length to receive the opposite extension to hold the extension against twisting, and means for securing the free ends of the sections together.

In testimony that I claim the foregoing as my own, I have hereto affixed my signature.

BURGESS TOLL-SPRY.